ELECTRONIC PULSE-REPETITION-FREQUENCY MULTIPLIER

Filed April 13, 1954 3 Sheets-Sheet 1

INVENTORS.
JESS H. HOFFMAN
ANDREW L. WARREN
BY
D. C. Snyder
Roderick B. Jones
ATTORNEYS June 2, 1959 J. H. HOFFMAN ET AL 2,889,454

ELECTRONIC PULSE-REPETITION-FREQUENCY MULTIPLIER

Filed April 13, 1954 3 Sheets-Sheet 2

INVENTORS.
JESS H. HOFFMAN
ANDREW L. WARREN
BY
D. C. Snyder
Roderick B. Jones
ATTORNEYS

ELECTRONIC PULSE-REPETITION-FREQUENCY MULTIPLIER

Filed April 13, 1954

3 Sheets-Sheet 3

INVENTORS.
JESS H. HOFFMAN
ANDREW L. WARREN
BY D. C. Snyder
Roderick B. Jones
ATTORNEYS 2,889,454

ELECTRONIC PULSE-REPETITION-FREQUENCY MULTIPLIER

Jess H. Hoffman, North Hollywood Township, Los Angeles County, Calif., and Andrew L. Warren, Gardenville Township, Bucks County, Pa.

Application April 13, 1954, Serial No. 423,004

12 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

This invention relates to frequency multipliers and more particularly to a device for accurately generating a pulse between two other pulses.

In certain instances it is necessary to couple an electronic device having a specific pulse-repetition-frequency (PRF) with one having a pulse-repetition-frequency twice the frequency of the first or parent device. One method previously devised to accomplish this result consisted of generating a sine wave that is frequency synchronized with a master pulse. The second harmonic is picked off, amplified, squared and differentiated and the resulting pulse is used to trigger a blocking oscillator that generates a slave pulse. Extreme difficulty is encountered, however, in maintaining proper phase and amplitude relationships. Selective filters are required to pick off the second harmonic and reject all others. Such filters limit the allowable variation of the input pulse-repetition-frequency to a narrow or restricted tolerance band due to the small bandwidth of the filters required.

Another method in use for multiplying a pulse-repetition-frequency by two consists of triggering a multivibrator with a master pulse, differentiating the resulting square wave and triggering a blocking oscillator to generate a slave pulse. D.-C. voltages must be generated proportional to the respective areas of the positive and negative portions of the square wave and fed back to control the period of the multivibrator. The natural period of the multivibrator must be set longer than the period of the triggering pulses. Thus, the frequency of the output pulses when the circuit is free-running will be lower than when it is being triggered. Then, too, the slopes of the leading and trailing edges of the multivibrator output cannot be made equal. Since these slopes are used to generate the output pulses, considerable error results in the system regardless of the efficiency of the feed-back loop.

Accordingly, it is an object of the present invention to provide a frequency-multiplier circuit wherein the above-described disadvantages are substantially eliminated.

Another object of the invention is to provide a frequency-multiplier circuit that will accurately multiply a pulse-reptition-frequency by two regardless of variation in the original pulse-repetition-frequency (PRF) over a wide tolerance of variation in this pulse-repetition frequency.

Still another object is to provide an electronic device that will couple a parent radar equipment to associated equipment whose PRF is twice that of the parent radar and hold them in accurate synchronization despite a plus or minus 10% variation in the PRF of the parent radar.

A further object of the present invention is to provide a frequency-multiplier circuit containing standard non-precision components that is substantially stable.

A further object of the invention is to provide in a frequency-multiplying device a peak-detecting circuit to generate an error voltage.

A still further object is to provide in a frequency-multiplying device an error-correcting system that compensates for tube aging and variations in values of circuit components.

Other objects and many of the attendant advantages of this invention will be readily appreciated as the same becomes better understood by reference to the following detailed description when considered in connection with the accompanying drawings wherein.

Figure 1:
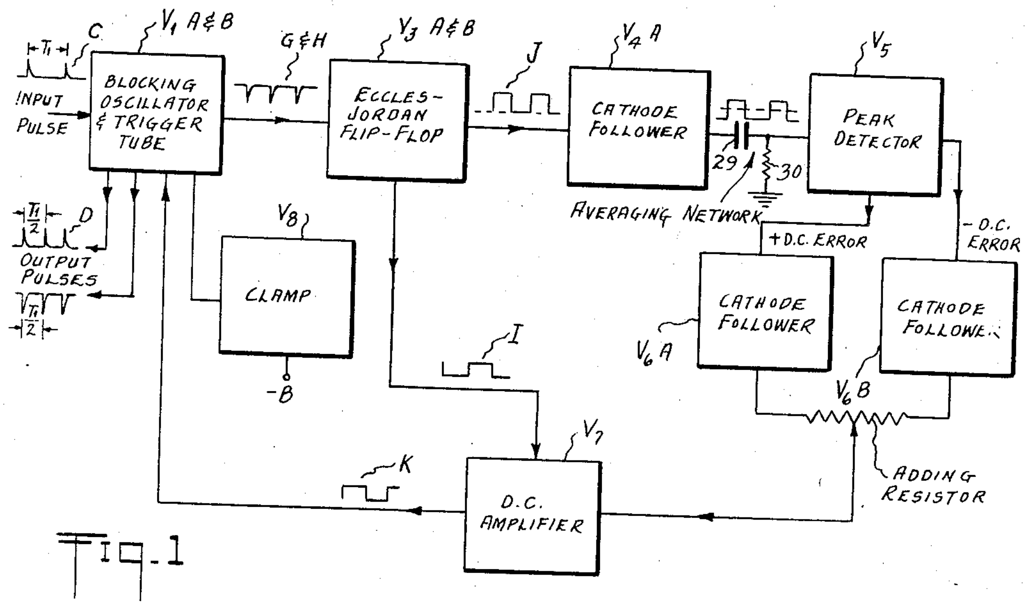
Fig. 1 is a block diagram of one embodiment of the invention for obtaining a frequency multiplication of two.

As represented schematically in Fig. 1 of the drawings, the multiplier device includes a triggering and blocking oscillator stage $V_1A$ and B, an Eccles-Jordan flip-flop stage $V_3A$ and B, a cathode-follower stage $V_4A$, an averaging network, a peak-detector stage $V_5$, a cathode-follower stage $V_6A$ and B, an error-adding resistor and a D.-C. amplifier stage $V_7$, all suitably connected to each other to provide means for multiplying an input frequency by a factor of two.

Figure 2:
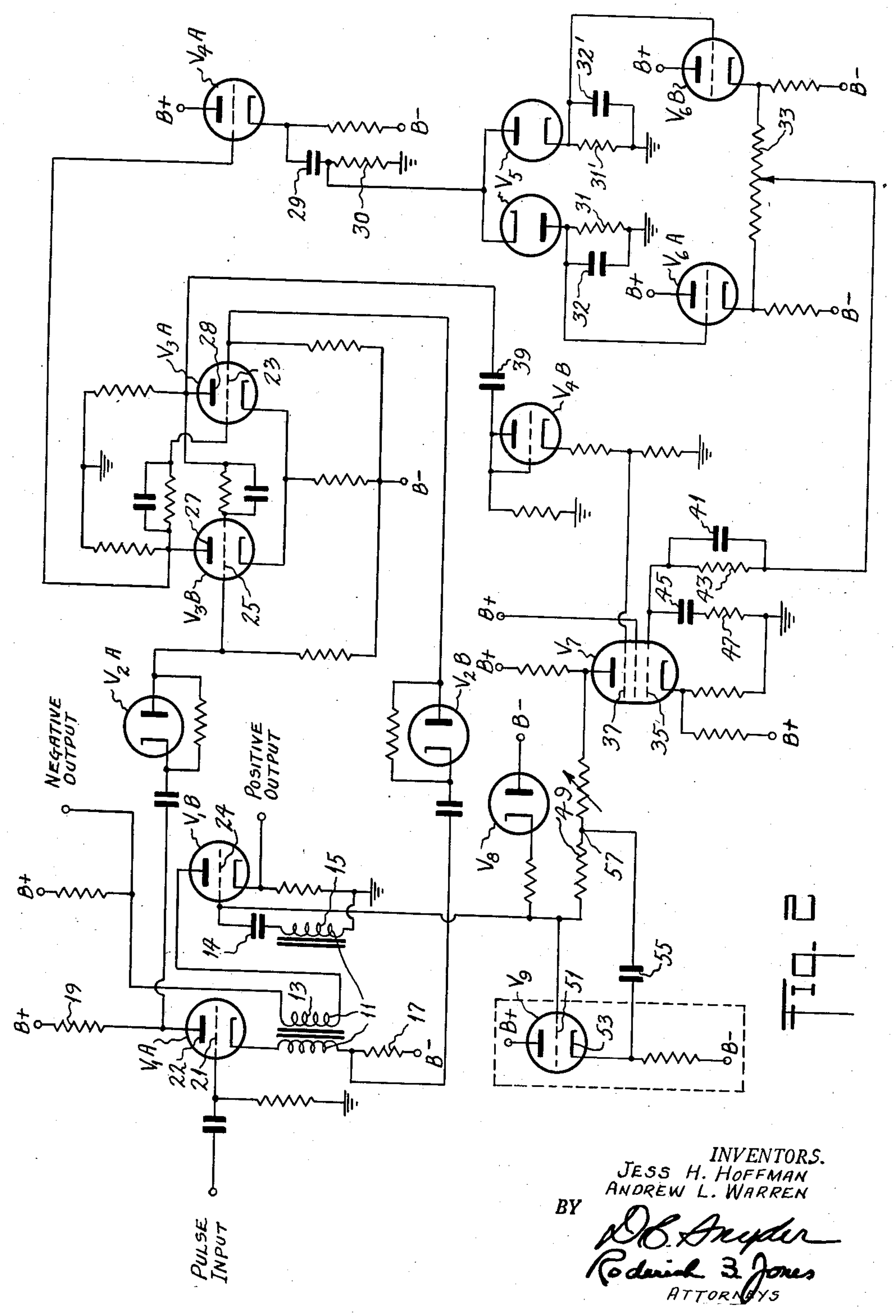
Fig. 2 is a schematic diagram of the invention of Fig. 1.

In a preferred embodiment of the invention as shown in Fig. 2, $V_1A$ is a trigger circuit suitably connected to a blocking oscillator circuit $V_1B$. Said blocking oscillator is designed to have a natural period of 1667 microseconds and is coupled to said trigger circuit through a pulse transformer 11 having its primary winding 13 in the plate circuit of triode $V_1B$ and a secondary winding 15 in the grid circuit of said triode $V_1B$. A suitable quiescent operating point is established for trigger tube $V_1A$ by resistors 17 and 19.

Figure 3:
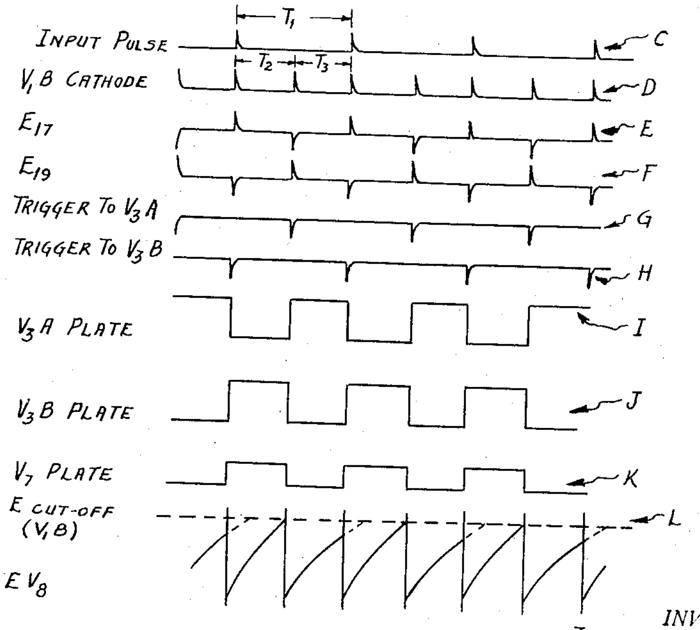
Fig. 3 is a series of idealized wave forms illustrating the principles of operation of the invention.

Three-hundred cycles-per-second pulses C from a master trigger source are fed to grid 21 of $V_1A$ producing synchronizing trigger pulses for $V_1B$ through transformer 11 on every other cycle of its natural frequency and causing a positive pulse to appear across resistor 17 and a negative pulse to appear across resistor 19 (see Fig. 3). On the next cycle of $V_1B$, a positive pulse appears at the cathode of $V_1A$, said positive pulse cutting-off $V_1A$ and resulting in a negative pulse appearing across resistor 17 and a positive pulse across resistor 19 due to the cessation of electron flow through $V_1A$. The resulting pulses E and F appearing across resistors 17 and 19 are diode-coupled through tubes $V_2A$ and $V_2B$ to a conventional Eccles-Jordan flip-flop circuit consisting of two triodes $V_3A$ and $V_3B$ having their elements suitably coupled together. Grids 23 and 25 of $V_3A$ and $V_3B$ respectively, alternately receive negative pulses G and H from $V_1A$ that are 3333 microseconds apart but are displaced in time from each other by $T_1-T_2$, where $T_1$ is the natural period of the 300 c.p.s input pulses from the parent radar and $T_2$ is the natural period of $V_1B$ (see Fig. 3). When $T_1=2T_2$, the pulse-repetition-frequency of the output of $V_1B$ is twice the pulse-repetition-frequency of the input to $V_1A$ and $T_2=T_3$, where $T_3$ is the difference between $T_1-T_2$. However, since $T_2+T_3$ is at all times equal to $T_1$ ($T_1=T_2+T_3$), and since $T_2$, the natural period of $V_1B$ tends to remain constant unless acted upon by an external force, $T_3$ will be greater or less than $T_2$ when $T_1$ varies.

The square-wave output J of $V_3B$ is fed from plate 27 of said tube to a cathode-follower circuit $V_4A$ and the output from $V_4A$ is fed through an "averaging network" consisting of condenser 29 and resistor 30 to peak-detector diodes $V_5$. When $T_1=T_2$, the absolute voltages appearing across resistors 31 and 31' are of equal magnitude ($|E_{31}|=|E_{31'}|$). These output voltages from peak detectors $V_5$ are fed to cathode followers $V_6A$ and $V_6B$ (correcting circuits) and the error voltage appearing at the midpoint of adding resistor 33 is zero. The operating point of control tube $V_7$ is so chosen that when the error voltage appearing across adding resistor 33 is zero, the PRF of tube $V_1B$ is exactly 600 cycles per second. When $T_1$ is not equal to $T_2$, ($T_1 \neq T_2$), the error voltage appearing across resistor 33 is fed to the grid 35 of D.C. amplifier $V_7$ causing the plate voltage K of said tube to change in such a direction so as to bring the error back to zero by changing $T_2$, or the natural frequency of $V_1B$. A more detailed explanation of the operation of peak detectors $V_5$ will be given hereinafter.

Alternate cycles of $V_1B$ must be triggered for proper operation of the error-detecting and correcting circuits. When $T_1$ is greater than two times $T_2$ ($T_1>2T_2$), the circuit will not function because the blocking oscillator $V_1B$ will fire twice at its natural frequency between trigger pulses unless a portion of the gate I at the plate 28 of tube $V_3A$ is diode-coupled through tube $V_4B$ to the suppressor grid 37 of tube $V_7$. This gate causes the plate voltage of $V_7$ to drop after the free-running pulse of $V_1B$ and makes the period of $V_1B$ sufficiently long to prevent it from firing until the trigger pulse from $V_1A$ is fed to it. With this arrangement, the circuit will continue to function satisfactorily although the PRF of the trigger input pulse drops as low as 250 c.p.s. By coupling in more of the gate from tube $V_3A$ to suppressor grid 37 of $V_7$, the lower limit of the PRF can be extended further. The 600 c.p.s. output D is taken from the cathode circuit of $V_1B$ or can be taken from the plate circuit of $V_1B$.

In order to correct the position of the free-running pulse of $V_1B$ in the proper direction, $V_3B$ must conduct with said free-running pulse and must be cut off when the trigger pulse is applied. Because grid 25 of $V_3B$ is coupled to plate 22 of $V_1A$, $V_3B$ is cut off when a trigger pulse is present regardless of which side of the flip-flop circuit ($V_3A$ and B) goes into conduction when power is first applied. To make this action more positive, $V_4A$ is D.-C. coupled to $V_3B$ so that there is no capacitive loading on plate 27 of $V_3B$ except the very low input capacity of $V_4A$. $V_4B$ is coupled to $V_3A$ by means of condenser 39 so that $V_3A$ is heavily loaded during the initial charging period of condenser 39, thereby allowing $V_3B$ to go into conduction faster and cut off $V_3A$.

Tube $V_8$ acts as a clamping circuit and is designed to limit the lower excursion of the voltage appearing across grid 24 of $V_1B$ and thus reduce pulse-to-pulse jitter. A filter network consisting of condenser 41 and resistor 43 and capacitor 45 and resistor 47 tends to stabilize the loop circuit from adding resistor 33 to grid 35 of tube $V_7$ and prevents hunting.

To further describe the operation of the clamping circuit, assume that blocking oscillator $V_1B$ has just been triggered by an incoming pulse. Grid 24 of $V_1B$ is driven positive through the regenerative action of coupling transformer 11 mutually coupled by windings 13 and 15 in the plate circuit of $V_1B$. Grid current flows as a result of the grid being positive with respect to the cathode and with the build-up of electrons on coupling condenser 14, grid 24 is immediately driven negative and $V_1B$ is cut off. Because of this negative cut-off voltage, grid 24 starts its exponential decay rising to the cut-off voltage of tube $V_1B$. Curves L of Fig. 3 show the wave form of the grid voltage of $V_1B$ and also the wave form of the voltage of $V_8$.

Because of the uncertainties of tube action caused by many internal and external factors, the same number of electrons will not always pile up on condenser 14 each time $V_1B$ fires. Under such condtions, $V_1B$ could drop to different voltage levels for different cycles. Thus, the time for the exponential to rise to cut-off voltage will vary and exact circuit timing will not be obtained. Clamp tube $V_8$ is inserted in the grid circuit of $V_1B$ to insure that the voltage will drop to the same negative potential for each cycle. By setting the B minus potential of $V_8$ at a point slightly more positive than the potential to which the grid voltage of $V_1B$ would drop if $V_8$ were not present, as the grid voltage of $V_1B$ starts to drop below such B minus voltage, tube $V_8$ conducts and the grid voltage of $V_1B$ will always stop at the same point. Excess electrons are thereby shunted or by-passed by $V_8$ as soon as the negative voltage reaches the B minus voltage level.

It is obvious that when no trigger-input pulse is applied to grid 21 of $V_1A$, $V_1B$ will be free-running. The only pulses that can then appear across resistors 17 and 19 are those due to $V_1A$ being cut off when $V_1B$ fires. As $V_1B$ fires, grid 23 of $V_3A$ receives a negative pulse but no pulse is received at grid 25 of $V_3B$ because diode $V_2A$ will not pass the positive pulse appearing at plate 22 of $V_1A$. This results in $V_3B$ going into conduction keeping $V_3A$ cut off because of the cathode coupling. Since no signal is fed to peak detector $V_5$, no error voltage is presented to grid 35 of $V_7$ and $V_1B$ continues to run free at 600 c.p.s. This is desirable and is claimed as one of the important features of this invention. Even though failure of the original source of master trigger pulses occurs, the circuit will continue to deliver pulses at approximately twice the original source repetition frequency to insure the continued operation of associated equipment.

Cathode follower $V_9$ shown in dotted box in Fig. 2 provides a means for feeding back voltage off the grid 24 of $V_1B$ to timing resistor 49 to approximately linearize the exponential discharge curve as indicated by L in Fig. 3 and thus reduces jitter. The end of resistor 49 connected to grid 24 of $V_1B$ follows the exponential curves of L. As grid 51 of $V_9$ follows said exponential rise of voltage, cathode 53 also rises in typical cathode-follower action. The rise in voltage of cathode 53 is fed back through condenser 55 (many times larger than condenser 14) to the tapped point 57. This regenerative action causes the slope of the discharge curve to remain fairly constant rather than leveling off in the usual exponential manner. Thus, the firing time of $V_1B$ is held to more nearly a constant timing.

Figure 4:
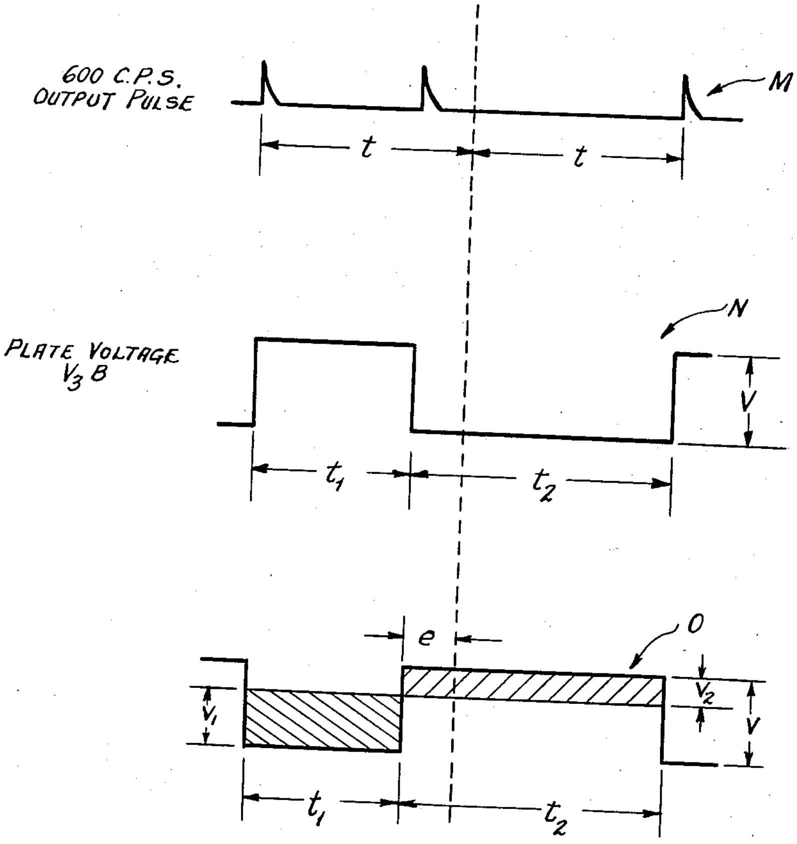
Fig. 4 represents a series of wave forms illustrating the operation of the peak-detector circuit.

To further describe the operation of peak detector $V_5$, consider the wave form M of Fig. 4 generated on the cathode of $V_1B$. For illustration purposes, it is assumed that an error exists in the spacing of the intermediate pulse. As shown on wave form N, $t_2$ is greater than $t_1$, indicating an error exists. In order to correct this error, a feedback error voltage must be generated. The square wave N is passed through cathode follower $V_4A$. Said cathode follower presents a high impedance to plate 27 and a low impedance to the peak detector circuit including diodes $V_5$ and resistors 31, 31' and capacitors 32 and 32'.

As wave N is passed through condenser 29, its D.C. component is averaged out and the cross-hatched areas of wave form O are equalized. Hence the area $V_1t_1$ is equal to area $V_2t_2$, where $V=V_1+V_2$. The object is to obtain an error signal in voltage that is directly proportional to the error in time. Designating $t$ as the desired time spacing, then:

$$t_1+e=t \quad (1)$$

and $$t_2-e=t \quad (2)$$

Subtracting Equations 1 and 2 above there results the equation:

$$e=\frac{t_2-t_1}{2} \quad (3)$$

where $e$ is designated as the error in time. It is noted that $V_1+V_2=V$ and V is a constant because the Eccles- Jordan trigger circuit always operates between the same voltage limits during its swing from one voltage level to another. From the fact that $V_1t_1=V_2t_2$ and Equations 1 and 2, the following equation is derived:

$$V_1(t-e)=V_2(t+e)$$

Thus:

$$V_1t-V_1e=V_2t+V_2e$$
$$t(V_1-V_2)=e(V_1+V_2)$$
$$\therefore V_1-V_2=\frac{(V_1+V_2)\,e}{t}$$

But, since $V_1+V_2=V$ and V is constant and $t$ is constant, therefore $V_1-V_2=Ke$, where $$K=\frac{V_1+V_2}{t}$$

and appears as a gain term in the feedback.

From the foregoing it is evident that voltages $V_1$ and $V_2$ must be detected. Such detection is accomplished in diodes $V_5$, said diodes being oppositely phased to detect the plus and minus voltages. Using peak detectors, the exact voltage is obtained. Upon conduction of diodes $V_5$ (which conduct alternately) condensers 32 and 32' associated with resistors 31 and 31', respectively, charge almost instantaneously to said voltages. Resistors 31 and 31' are set at a value large enough to substantially maintain this charge over the required time, $t$, but are small enough in resistance to allow the charge to change fast enough to follow any variations in error signal that are caused in the circuit.

The difference voltage $V_1-V_2$ is obtained by means of $V_6$A and $V_6$B. Voltages $V_1$ and $V_2$ are subtracted by means of common resistor 33 and the resulting differenced voltage is then applied to grid 35 of $V_7$ for corrective action on the blocking oscillator's timing.

$V_4$B is a gating tube which, at the time a trigger pulse is supposed to be applied to synchronize the blocking oscillator $V_1$B, prevents $V_1$B from firing until the trigger pulse is actually applied. To accomplish this the plate voltage of $V_3$A, which is a positive-going rectangular pulse initiated by the ocurrence of the free-running pulse of the blocking oscillator, is applied to the plate of $V_4$B causing a positive-going rectangular pulse to appear at the cathode of $V_4$B and therefore at the suppressor grid of $V_7$. This drops the plate voltage of $V_7$, thereby keeping the grid voltage of the blocking oscillator $V_1$B from rising above its cut-off voltage level until a trigger pulse is applied to the grid. This insures positive synchronization of every second pulse of the blocking oscillator with the input signal.

One embodiment of the invention found to have practical utility included the following:

| | |
|---|---|
| Tube $V_1$(A and B) | Type 12AX7. |
| Tube $V_2$(A and B) | Type 6AL5. |
| Tube $V_3$(A and B) | Type 12AU7. |
| Tube $V_4$(A and B) | Type 12AU7. |
| Tube $V_5$ | Type 6AL5. |
| Tube $V_6$(A and B) | Type 12AX7. |
| Tube $V_7$ | Type 6AS6. |
| Tube $V_8$ | Type 6AL5. |
| Resistor **17** | 0.1 megohm. |
| Resistor **19** | 20,000 ohms. |
| Resistor **30** | 0.33 megohm. |
| Resistor **31** | 1.0 megohm. |
| Resistor **33** | 1.0 megohm. |
| Resistor **43** | 1.0 megohm. |
| Resistor **49** | 2.2 megohms in series with 1.0 megohm. |
| Resistor **47** | 1.000 ohm. |
| Condenser **14** | 0.003 microfarad. |
| Condenser **29** | 0.5 microfarad. |
| Condenser **32** | 0.05 microfarad. |
| Condenser **41** | 0.002 microfarad. |
| Condenser **45** | 0.25 microfarad. |

In an alternate construction of the invention, cathode followers $V_4$A, $V_6$A and $V_6$B can be replaced by suitable impedance-matching components without detracting from the spirit of the invention or its operability. Some accuracy will be sacrificed by omitting tubes $V_6$A and $V_6$B. Omitting $V_4$A might necessitate replacing triodes $V_3$A and $V_3$B with pentodes because of changes in loading in the flip-flop circuit. D.-C. amplifier $V_7$ can also be omitted by feeding the error voltage developed at resistor 33 to a clamp tube $V_8$ instead of the RC timing circuit of $V_1$B. Jitter can be reduced by picking off the grid voltage of $V_1$B and feeding it back to timing resistor 49. This straightens out the exponential discharge curve that controls period of the blocking oscillator and causes $V_1$B to fire more nearly at the same time on each pulse.

Obviously many modifications and variations of the present invention are possible in the light of the above teachings. It is therefore to be understood that within the scope of the appended claims the invention may be practiced otherwise than as specifically described.

What is claimed:

1. A device for producing an output pulse signal having double the pulse repetition frequency of an input pulse signal of predetermined pulse repetition frequency comprising, in combination: connection means for connecting to a source of said input pulse signal; oscillator means generating pulses at a rate which is approximately double the pulse repetition frequency of said input signal; trigger means, connected to said input signal connections and to said oscillator means, generating a first trigger pulse for each input pulse, said first trigger pulse being applied to said oscillator means to synchronize the timing of alternate oscillator pulses, a second trigger pulse simultaneous with each synchronized oscillator pulse and a third trigger pulse simultaneous with each unsynchronized oscillator pulse, said unsynchronized oscillator pulses being fed back to said trigger means to control the generation of said third trigger pulses, said oscillator means and said trigger means thus mutually interacting and controlling one another's operation; and frequency-correction means, connected to said trigger means and said oscillator means, generating a correction signal from said second and third trigger pulses for correcting the rate at which pulses are produced by said oscillator means when said rate is not exactly double that of the pulse repetition frequency of said input signal.

2. A device for producing an output pulse signal having a pulse repetition frequency which is a selected even multiple of the repetition frequency of an input pulse signal of predetermined repetition frequency comprising, in combination: connection means for connecting to a source of said input pulse signal; oscillator means generating pulses at a rate approximately equal to a selected even multiple of the pulse repetition frequency of said input signal; trigger means, connected to said input signal connections and to said oscillator means, generating a first trigger pulse for each input pulse, said first trigger pulse being applied to said oscillator means to synchronize the timing of alternate oscillator pulses, a second trigger pulse simultaneous with each synchronized oscillator pulse, and a third trigger pulse simultaneous with each unsynchronized oscillator pulse, said unsynchronized oscillator pulses being fed back to said trigger means to control the generation of said third trigger pulses, said oscillator means and said trigger means thus mutually interacting and controlling one another's operation; and frequency-correction means, connected to said trigger means and said oscillator means, generating a correction signal from said second and third trigger pulses for correcting the rate at which pulses are produced by said oscillator means when said rate is not exactly said selected even multiple of the pulse repetition frequency of said input signal.

3. A device for producing an output pulse signal having double the pulse repetition frequency of an input pulse signal of predetermined pulse repetition frequency comprising, in combination: connection means for connecting to a source of said input pulse signal; oscillator means generating pulses at a rate which is approximately double the pulse repetition frequency of said input signal; trigger means, connected to said input signal connections and to said oscillator means, generating a first set of trigger pulses, one for each input pulse, said trigger pulses being applied to said oscillator means to synchronize the timing of alternate oscillator pulses with said trigger pulses, a second set of trigger pulses in synchronism with said alternate oscillator pulses, and a third set of trigger pulses in synchronism with the unsynchronized oscillator pulses, said third set resulting from the feeding back of said unsynchronized oscillator pulses to said trigger means, said oscillator means and said trigger means thus mutually interacting and controlling one another's operation; and frequency-correction means, connected to said trigger means and said oscillator means, generating a correction signal from said second and third sets of trigger pulses for correcting the rate at which pulses are produced by said oscillator means when said rate is not exactly double that of the pulse repetition frequency of said input signal.

4. A device for producing an output pulse signal having a pulse repetition frequency which is a selected even multiple of the repetition frequency of an input pulse signal of predetermined repetition frequency comprising, in combination: connection means for connecting to a source of said input pulse signal; oscillator means generating pulses at a rate approximately equal to a selected even multiple of the pulse repetition frequency of said input signal; trigger means, connected to said input signal connections and to said oscillator means, generating a first set of trigger pulses, one for each input pulse, said trigger pulses being applied to said oscillator means to synchronize the timing of alternate oscillator pulses with said trigger pulses, a second set of trigger pulses in synchronism with said alternate oscillator pulses, and a third set of trigger pulses in synchronism with the unsynchronized oscillator pulses, said third set resulting from the feeding back of said unsynchronized oscillator pulses to said trigger means, said oscillator means and said trigger means thus mutually interacting and controlling one another's operation; and frequency-correction means, connected to said trigger means and said oscillator means, generating a correction signal from said second and third sets of trigger pulses for correcting the rate at which pulses are produced by said oscillator means when said rate is not exactly double that of the pulse repetition frequency of said input signal.

5. A device for producing an output pulse signal having double the pulse repetition frequency of an input signal of predetermined pulse repetition frequency comprising, in combination: connection means for connecting to a source of said input pulse signal; oscillator means generating pulses at a rate which is approximately double the pulse repetition frequency of said input signal; trigger means, connected to said input signal connections and to said oscillator means, generating a first set of trigger pulses, one for each input pulse, said trigger pulses being applied to said oscillator means to synchronize the timing of alternate oscillator pulses with said trigger pulses, a second set of trigger pulses in synchronism with said alternate oscillator pulses, and a third set of trigger pulses in synchronism with the unsynchronized oscillator pulses, said third set resulting from the feeding back of said unsynchronized oscillator pulses to said trigger means, said oscillator means and said trigger means thus mutually interacting and controlling one another's operation; and frequency-correction means, connected to said trigger means and said oscillator means, generating signals of opposite polarity having time durations determined by said second and third sets of trigger pulses and generating a correction signal for correcting the rate at which pulses are produced by said oscillator means when said rate is not exactly double that of the pulse repetition frequency of said input signal, said correction signal being proportional to the difference in the time durations of said signals of opposite polarity.

6. A device for producing an output pulse signal having a pulse repetition frequency which is a selected even multiple of the repetition frequency of an input pulse of predetermined repetition frequency comprising, in combination: connection means for connecting to a source of said input pulse signal; oscillator means generating pulses at a rate approximately equal to a selected even multiple of the pulse repetition frequency of said input signal; trigger means, connected to said input signal connections and to said oscillator means, generating a first set of trigger pulses, one for each input pulse, said trigger pulses being applied to said oscillator means to synchronize the timing of alternate oscillator pulses with said trigger pulses, a second set of trigger pulses in synchronism with said alternate oscillator pulses, and a third set of trigger pulses in synchronism with the unsynchronized oscillator pulses, said third set resulting from the feeding back of said unsynchronized oscillator pulses to said trigger means, said oscillator means and said trigger means thus mutually interacting and controlling one another's operation; and frequency-correction means, connected to said trigger means and said oscillator means, generating signals of opposite polarity having time durations determined by said second and third sets of trigger pulses, and generating a correction signal for correcting the rate at which pulses are produced by said oscillator means when said rate is not exactly equal to said selected even multiple of the pulse repetition frequency of said input signal, said correction signal being proportional to the difference in the time durations of said signals of opposite polarity which occur within one period of said input pulse signal.

7. A device for producing an output pulse signal having double the pulse repetition frequency of an input pulse signal of predetermined pulse repetition frequency comprising, in combination: connection means for connecting to a source of said input pulse signal; oscillator means generating pulses at approximately double the pulse repetition frequency of said input signal; trigger means, connected to said connection means and said oscillator means, generating a first set of trigger pulses in synchronism with the input pulses, said trigger pulses being applied to said oscillator means to synchronize the timing of alternate oscillator pulses with said trigger pulses, a second set of trigger pulses in synchronism with said synchronized oscillator pulses, and a third set of trigger pulses in synchronism with the unsynchronized oscillator pulses, said third set resulting from the feeding back of said unsynchronized oscillator pulses to said trigger means, said oscillator means and said trigger means thus mutually interacting and controlling one another's operation; means, connected to said trigger means, generating an alternating signal the reversals of polarity of which are initiated by pulses from each of said second and third sets of trigger pulses in alternation; means, connected to said alternating signal means, averaging the area of each cycle of said alternating signal, whereby two sections of opposite polarity are established in each cycle and whereby the peak value of any section depends upon the time duration of that section, and providing signals proportional to said peak values; means, connected to said averaging means, deriving a signal proportional to the difference between the peak values of opposite polarity in each cycle, said difference signal existing only when the pulse repetition rate of said oscillator means is not exactly double that of said input signal; and means, connected to said deriving means, applying said difference signal to said oscillator means to correct its pulse repetition frequency to exactly double that of said input pulse signal.

8. A device for producing an output pulse signal having double the pulse repetition frequency of an input pulse signal of predetermined pulse repetition frequency comprising, in combination: connection means for connecting to a source of said input pulse signal; oscillator means generating pulses at approximately double the pulse repetition frequency of said input signal; trigger means, connected to said connection means and said oscillator means, generating a first set of trigger pulses which are applied to said oscillator means to synchronize the timing of alternate oscillator pulses with said trigger pulses, a second set of trigger pulses in synchronism with said alternate oscillator pulses and a third set of trigger pulses in synchronism with the unsynchronized oscillator pulses, said third set resulting from the feeding back of said unsynchronized oscillator pulses to the trigger means, said oscillator means and said trigger means thus mutually interacting and controlling one another's operation; means, connected to said trigger means, generating a rectangular signal the reversals of direction of which are initiated by pulses from each of said second and third sets of trigger pulses in alternation; means, connected to said rectangular signal means, averaging the area of each cycle of said rectangular signal, whereby two sections of opposite polarity are established in each cycle and whereby the peak value of any section depends upon the time duration of that section, and providing signals proportional to said peak values; detecting means, connected to said averaging means, deriving a signal proportional to the difference between the peak values of opposite polarity in each cycle, said difference signal existing only when the pulse repetition rate of said oscillator means is not exactly double that of said input signal; and means, connected to said detecting means, applying said difference signal to said oscillator means to correct its pulse frequency to exactly double that of said input pulse signal.

9. A device as set forth in claim 8, wherein said trigger means comprises a unidirectional current device having an emitting element, a control element and a collecting element, first diode means, second diode means, first and second impedances and a secondary winding of a transformer, the collecting element of said unidirectional current device being connected to a source of positive supply voltage through said first impedance, the control element being connected to receive said input pulses and the emitting element being connected to a source of negative supply voltage through said secondary winding of said transformer and said second impedance in series, one set of trigger pulses being derived from the collecting element through said first diode means and the other set being derived from the junction of said secondary winding and said second impedance through said second diode means, and wherein said oscillator means comprises a second unidirectional current device having an emitting element, a control element and a collecting element, the primary winding of said transformer, third, fourth and fifth impedances, and another secondary winding of said transformer, the collecting element of said second unidirectional current device being connected to a source of positive supply voltage through said primary winding of said transformer and said third impedance in series, the emitting element being connected to a point of reference potential through said fourth impedance, and the control element being connected to said point of reference potential through said fifth impedance and said other secondary winding of said transformer in series.

10. A device as set forth in claim 9, wherein said means generating a rectangular signal is a flip-flop circuit including a pair of unidirectional current devices cross-connected to provide a bistable condition, the set of said trigger pulses which is synchronized with said input pulses being applied to the first said current device and the other set of said trigger pulses being applied to the second said current device.

11. A device as set forth in claim 10, wherein said averaging means comprises a capacitance and resistance in series, the free end of said capacitance being connected to receive said rectangular signal and the free end of said resistance being connected to said point of reference potential, and wherein said detecting means comprises a pair of diodes each having an emitting and a collecting element, the emitting element of the first diode being connected to the collecting element of the second diode and to the junction between said resistance and said capacitance of said averaging means, a second capacitance and second resistance in parallel, one end of said second capacitance being connected to the collecting element of said first diode and the other end being connected to said point of reference potential, a third capacitance and a third resistance in parallel, one end of said third capacitance being connected to the emitting element of said second diode and the other end to said point of reference potential, a potential-dividing impedance one end of which is connected to receive the output of said first diode and the other end of which is connected to receive the output of said second diode, the output of said potential-dividing impedance being derived from its moving arm which is set at the point providing zero output when said two sections of said rectangular signal are of equal time duration, and a D.C. amplifier circuit including a unidirectional current device having an emitting element, a collecting element and at least one control element which is connected to the moving arm of said potential-dividing impedance, the collecting element being connected to the control element of said oscillator means.

12. A device as set forth in claim 11, wherein said unidirectional current device of said D.C. amplifier includes another control element, said device as set forth in claim 11 further including a gating circuit comprising a unidirectional current device having an emitting element and a collecting element, a capacitance and a pair of impedances, said capacitance coupling the output of said second unidirectional current device of said flip-flop circuit to said collecting element of said unidirectional current device of said gating circuit, said last-named collecting element also being connected to said point of reference potential through one of said pair of impedances, the second of said pair of impedances connecting the point of reference potential to the emitting element of said unidirectional current device of said gating circuit, said last-named emitting element also being connected to said other control element of said unidirectional current device of said D.C. amplifier.

References Cited in the file of this patent

UNITED STATES PATENTS

| | | |
|---|---|---|
| 2,125,732 | Bowman-Manifold et al. | Aug. 2, 1938 |
| 2,277,000 | Bingley | Mar. 17, 1942 |
| 2,490,404 | Bliss | Dec. 6, 1949 |
| 2,640,155 | Rambo | May 26, 1953 |
| 2,643,330 | Borgeson | June 23, 1953 |
| 2,659,856 | Gannaway | Nov. 17, 1953 |
| 2,747,097 | Naidich | May 22, 1956 |